Oct. 21, 1930.    W. B. LASHAR    1,779,256
SCREW EYE
Filed Nov. 12, 1926
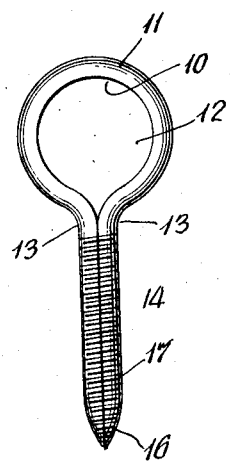
INVENTOR
Walter B. Lashar
BY
ATTORNEY Patented Oct. 21, 1930

1,779,256

UNITED STATES PATENT OFFICE

WALTER B. LASHAR, OF FAIRFIELD, CONNECTICUT, ASSIGNOR TO AMERICAN CHAIN COMPANY, INC., A CORPORATION OF NEW YORK

SCREW EYE

Application filed November 12, 1926. Serial No. 147,861.

My invention relates to improvements in attachment devices of the kind comprising an eye and a threaded shank. In the ordinary form of construction screw eyes are made of a piece of wire or rod with one end thereof threaded and the other end bent annularly to form an eye. The stiffness of the wire is depended upon to prevent the eye from pulling open in service, and it often happens that the free end of the eye portion bends open when the screw eye is subjected to severe tension.

It is an object of my invention to provide an improved screw eye in which the stiffness of the material is not depended upon to keep the eye from pulling open, and in which the eye portion has no free end.

Another object of my invention is to provide an improved screw eye which is of very simple and economical construction.

Another object of my invention is to provide a new method of manufacturing screw eyes.

Referring to the drawing, the figure illustrates in side elevation an example of my improved screw eye which is made of a single piece of wire or rod which may be of any desired cross-section but preferably should have one side flat.

Accordingly I have shown a screw eye formed of half-round wire, i. e., the wire is of semi-circular cross-section, having a flat side 10 and a rounded side 11.

The screw eye is made by bending a piece of wire into a loop, with the flat side 10 at the inner periphery of the loop, thereby producing an eye 12. The end portions 13 of the piece of wire are then pressed together with their flat faces contacting. In this position the end portions are united, preferably by welding, to form a single solid shank 14 of cylindrical form.

The shank is pointed at the free end 16, and a thread 17 cut on the shank extends to the tip of the pointed end. Thus the screw eye is adapted to be screwed into a piece of wood or other relatively soft material.

Various modifications of my invention can be made without departing from the spirit and scope of my invention as defined in the following claim.

I claim:

As an article of manufacture a screw eye formed of a piece of half-round wire, the wire being bent intermediate its ends to form an eye with the flat face of the wire at the inner periphery of the eye, the ends of the wire being joined metallically with their flat faces contacting to form a shank, said shank being tapered at one end to form a point and formed with a thread extending to the pointed end thereof.

In testimony whereof, I have signed this specification.

WALTER B. LASHAR.